United States Patent
Coscarella

(10) Patent No.: US 11,480,268 B2
(45) Date of Patent: Oct. 25, 2022

(54) SEAL FOR A PROTRUSION ON AN EXTERIOR WALL

(76) Inventor: Gabe Coscarella, Edmonton (CA)

( * ) Notice: Subject to any disclaimer, the term of this patent is extended or adjusted under 35 U.S.C. 154(b) by 0 days.

(21) Appl. No.: 13/601,994

(22) Filed: Aug. 31, 2012

(65) Prior Publication Data

US 2013/0234404 A1 Sep. 12, 2013

(30) Foreign Application Priority Data

Sep. 2, 2011 (CA) .............................. CA 2751997

(51) Int. Cl.
*F16L 5/02* (2006.01)
*F16L 5/10* (2006.01)

(52) U.S. Cl.
CPC .. *F16L 5/02* (2013.01); *F16L 5/10* (2013.01)

(58) Field of Classification Search
CPC ...................................... F16L 5/02; F16L 5/10
USPC .......... 277/604, 606, 607, 617, 626; 249/39; 285/139.2
See application file for complete search history.

(56) References Cited

U.S. PATENT DOCUMENTS

| | | | | |
|---|---|---|---|---|
| 3,788,655 A * | 1/1974 | Hathaway | ................. | F16L 5/10 16/2.2 |
| 4,350,351 A * | 9/1982 | Martin | ........................... | 277/606 |
| 4,903,997 A * | 2/1990 | Kifer | .............................. | 285/43 |
| 5,248,154 A * | 9/1993 | Westhoff et al. | ............. | 277/606 |
| 5,501,472 A * | 3/1996 | Brancher et al. | ............. | 277/606 |
| 5,977,486 A * | 11/1999 | Fujita | ........................ | F16L 5/02 174/152 R |
| 6,079,751 A * | 6/2000 | Youngs | ..................... | F16L 5/06 285/139.1 |
| 6,395,984 B1 | 5/2002 | Gilleran | | |
| 6,543,186 B2 * | 4/2003 | Gilleran | ................... | E03B 7/09 285/39 |
| 6,596,938 B2 | 7/2003 | Gilleran | | |
| 6,649,835 B2 | 11/2003 | Gilleran | | |
| 6,860,070 B2 | 3/2005 | Gilleran | | |
| 8,079,599 B2 * | 12/2011 | Meyers | ........................ | 277/606 |
| 2003/0019163 A1* | 1/2003 | Dittel | ................................ | 52/20 |
| 2011/0024993 A1* | 2/2011 | Happel et al. | ................ | 277/606 |

FOREIGN PATENT DOCUMENTS

CA  2 452 668 A1  3/2005
EP  0161557 A2 * 11/1985 ............. F16L 5/022

* cited by examiner

*Primary Examiner* — Eugene G Byrd
(74) *Attorney, Agent, or Firm* — Christensen O'Connor Johnson Kindness PLLC

(57) ABSTRACT

A seal for a protrusion from an exterior wall of a structure includes a sheet made from flexible material, the sheet comprising a wall cover portion and a protrusion engaging collar. The protrusion engaging collar extends outward from the wall cover portion and defines a hole. The collar has a first inner perimeter adjacent to the wall cover portion and a second inner perimeter spaced from the wall cover portion. The first inner perimeter is larger than the outer perimeter of the protrusion and the second inner perimeter is equal to or smaller than the outer perimeter of the protrusion. The collar provides a seal around the outer diameter of the protrusion when installed.

18 Claims, 5 Drawing Sheets

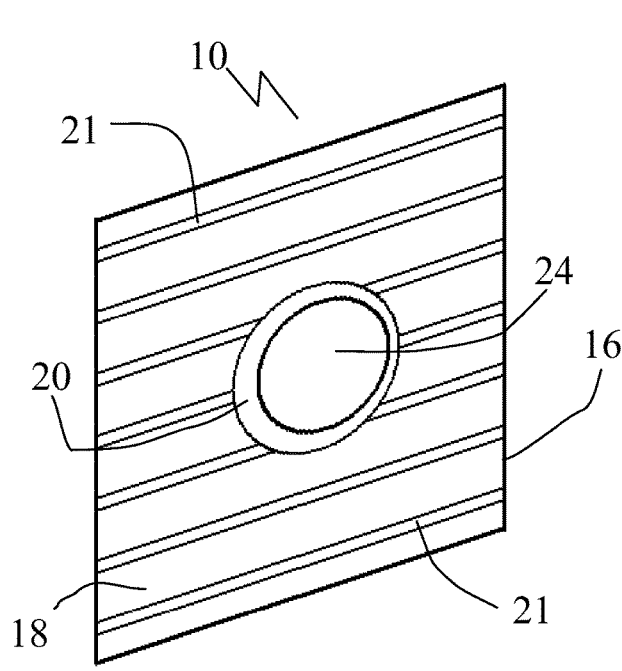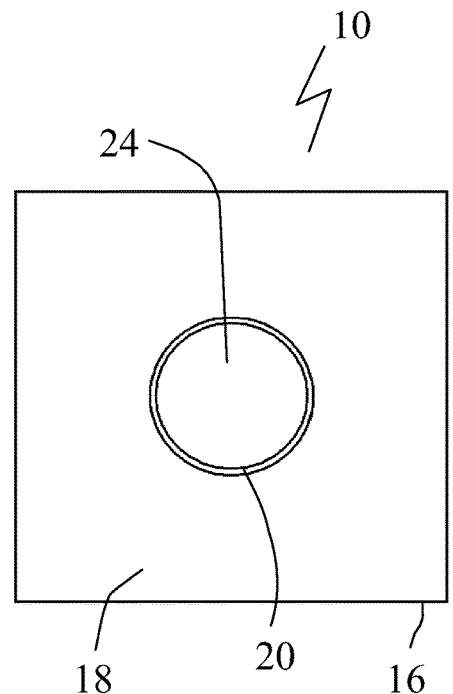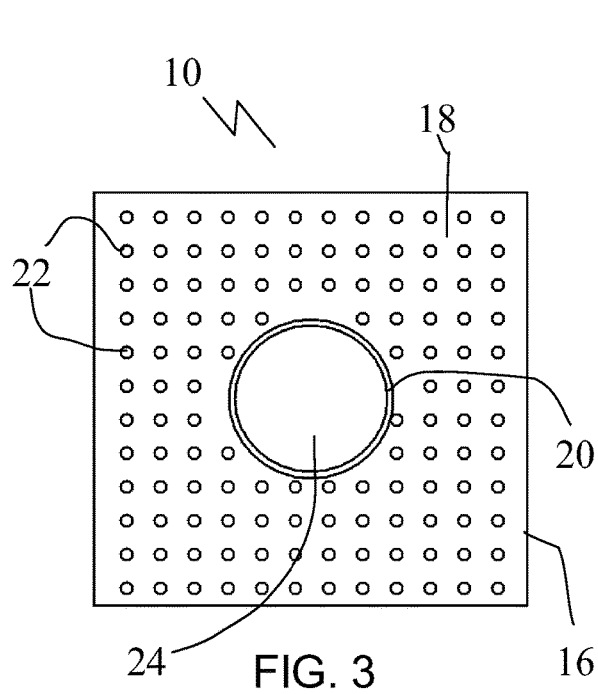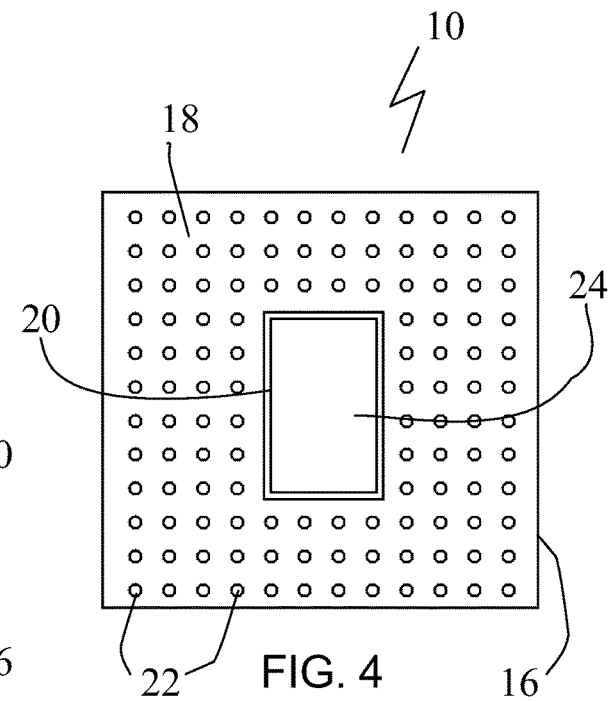

SEAL FOR A PROTRUSION ON AN EXTERIOR WALL

FIELD

This relates to a seal for protrusions on an exterior wall of a structure, such as piping, utility covers, etc.

BACKGROUND

Vents, such as exhausts or fresh air intakes, through exterior walls of structures are required for certain appliances, such as water heaters, furnaces, etc. Other types of piping or protrusions may also be installed, such as a hose bib or utility cover. Once installed, it is necessary to seal around these vents, which is commonly done using caulking to fill the gap between the wall and the vent, and to ensure the wall around the vent is weather resistant.

SUMMARY

There is provided a seal for a protrusion from an exterior wall of a structure. The resilient seal comprises a sheet made from flexible material, the sheet comprising a wall cover portion and a protrusion engaging collar. The protrusion engaging collar extending outward from the wall cover portion, the protrusion engaging collar comprising a collar forming a hole, the collar having a first inner perimeter adjacent to the wall cover portion and a second inner perimeter spaced from the wall cover portion, the first inner perimeter being larger than the outer perimeter of the protrusion and the second inner perimeter being equal to or smaller than the outer perimeter of the protrusion, the collar providing a seal around the outer diameter of the protrusion when installed.

According to an aspect, the protrusion may be piping that passes through a hole in the exterior wall of the structure, the piping having an outer diameter that is less than an inner diameter of the hole.

According to an aspect, the sheet is resilient, and the second inner perimeter is smaller than the outer perimeter of the protrusion, the second inner perimeter providing a resilient seal around the outer diameter of the vent.

According to an aspect, a pressure member may seal the collar around the outer perimeter of the protrusion, or a sealant may seal the collar to the outer perimeter of the protrusion.

According to an aspect, the sheet may comprise a textured surface that permits airflow between the sheet and the exterior wall. The textured surface may comprises bumps or ridges.

According to an aspect, the protrusion may have a round or rectangular cross-section.

According to an aspect, there may further comprise a face plate having an opening that is installed adjacent to the sheet such that the protrusion engaging collar is received within the opening of the face plate. The wall cover portion may extend out past the face plate. When the face plate is installed, the wall cover portion may comprise a profile along an outer perimeter of the face plate.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1 is a perspective view of a seal.
FIGS. 2 through 4 are front elevation views of a seal.

DETAILED DESCRIPTION

In this document, the term "protrusion" is used to refer to anything installed on an exterior wall of a building that generally extends through the siding or outer finishing of the wall. Protrusions may include piping that passes through an exterior wall to provide fluid communication between the interior of the structure and the outside environment, such as vents that are used as exhaust outlets or fresh air intakes for combustion appliances such as hot water tanks, furnaces, boilers, etc. Other protrusions may include other piping, such as hose bibs, electrical or other utility conduits, or covers, such as utility covers.

In order to make structures more efficient, there is a greater emphasis placed on making buildings weather resistant, and in particular, moisture resistant. A consequence of this is that the walls of the building do not breathe as well. For example, in older structures that are not as air tight, if the inner wall is occasionally exposed to a small amount of moisture, it will be permitted to dry before serious damage occurs. However, in a building that does not breathe as well, any moisture may result in damage.

In one example, when installing a vent, it is necessary to make a hole in the wall that is larger than the outer diameter of the piping. The space between the piping and the wall must then be blocked. Caulking is commonly used to fill the gap. However, caulking may not provide the necessary seal, and may allow moisture to access the wall, or leave a small gap through which air may flow. The presently described seal provides a seal between the wall and the vent that prevents water from accessing the wall and provides an effective air barrier that is easy and inexpensive to install. A protrusion may also make it more difficult to provide the appropriate weatherproofing material around the protrusion.

Figure 8:
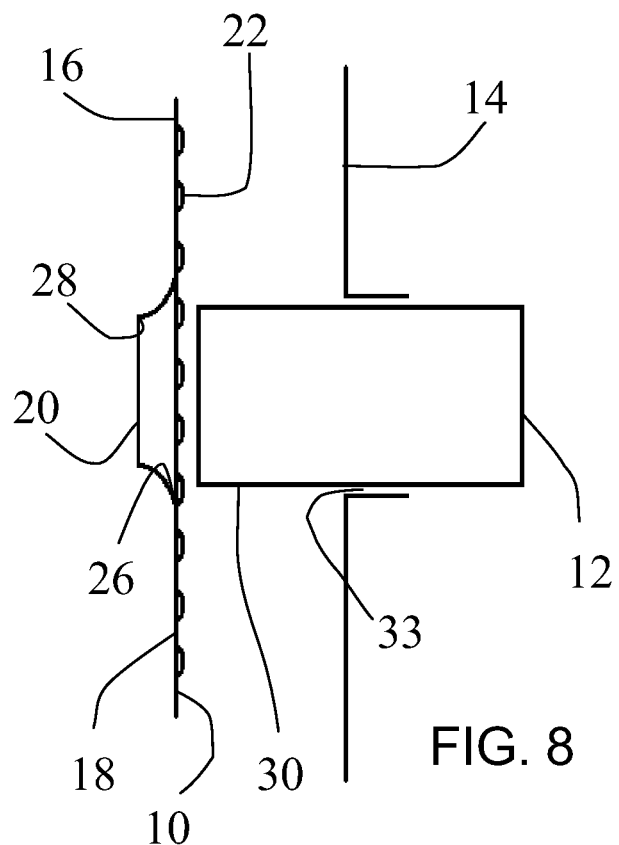
FIG. 8 is a side elevation view of a seal being installed on piping.
Figure 9:
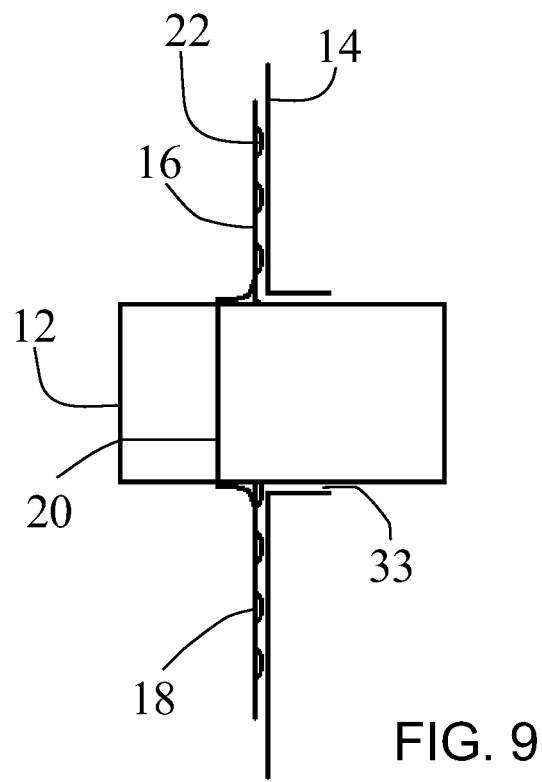
FIG. 9 is a side elevation view of a seal installed on piping.

Referring now to FIGS. 8 and 9, there is shown a seal 10 for a protrusion 12 from an exterior wall 14 of a structure. Referring to FIGS. 1 and 2, resilient seal has a sheet 16 made from flexible material. Sheet 16 has a wall cover portion 18 and a protrusion engaging collar 20.

Wall cover portion 18 has a planar surface that is larger than protrusion 12. Preferably, wall cover portion 18 is large enough to easily overlap with the weatherproofing material installed on exterior wall 14, such as Tyvek™. Sheet 16 may be made from a resilient material. Sheet 16 may also be made from an air-tight material. As many building codes require all weatherproofing materials to allow some air flow, it may be necessary to provide wall cover portion 18 with a contoured surface, such as ridges 21, as shown in FIGS. 1 and 5-7. Ridges 21 may be on the front side or back side of wall cover portion 18. If on the front side, preferably the ridges 21 will form air flow conduits on the back side that will be against exterior wall 14. Another type of contoured surface included a series of bump 22, as shown in FIGS. 3, 4, 8 and 9. Bumps 22 are preferably on the back side of wall cover portion 18 that will be adjacent to exterior wall 14. Sheet 16 may also be flat as shown in FIG. 2, this is preferable when seal 10 is made of a weatherproofing material that is not airtight such as Tyvek™. Alternatively, sheet 16 may be reversible by turning protrusion engaging collar 20 inside out, such that the user may select which side of sheet ridges 21 or bumps 22 may be located.

Referring to FIG. 1, protrusion engaging collar 20 extends outward from wall cover portion 18 and defines a hole 24. Referring to FIGS. 8 and 9, collar 20 has a first inner perimeter 26 that is adjacent to wall cover portion 18 and a second inner perimeter 28 spaced from wall cover portion 18. First inner perimeter 26 is larger than the outer perimeter 30 of protrusion 12, while second inner perimeter 28 is equal to or smaller than outer perimeter 30 of protrusion 12. By providing a first inner perimeter 26 that is larger than outer perimeter 30 of protrusion 12, it provides a guide and a start to insert protrusion 12 into collar 20. Collar 20 provides a seal around the outer diameter of protrusion 12 when installed. As shown, protrusion 12 is piping that passes through a hole 33 in exterior wall 14 that has an outer diameter that is less than an inner diameter of hole 33.

Figure 7:
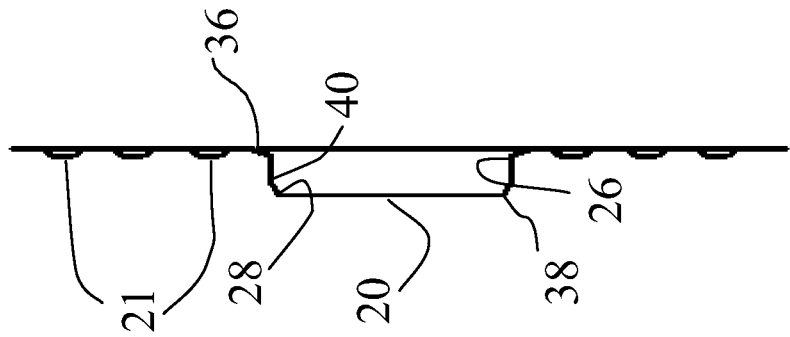
FIGS. 5 through 7 are side elevation views of variations of seals.
Figure 6:
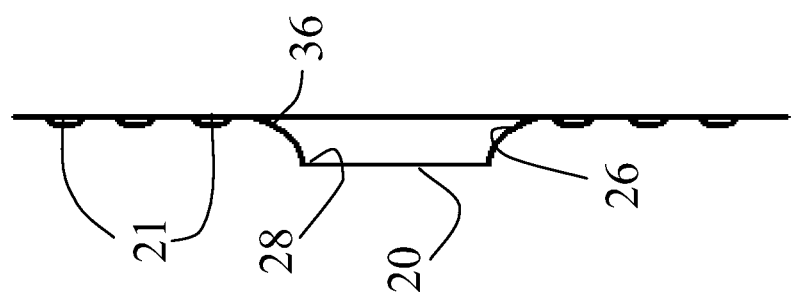
Figure 5:
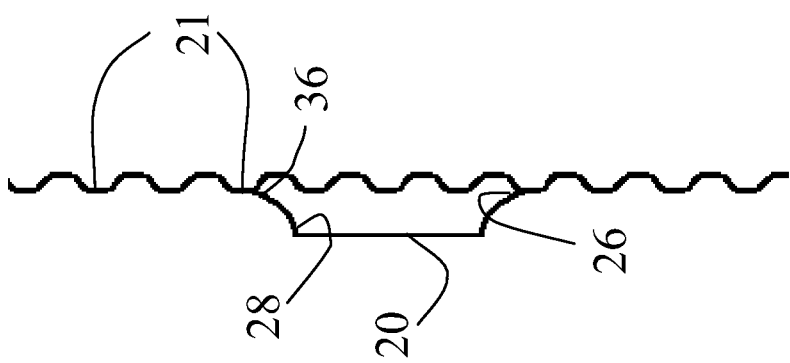

Referring to FIGS. 5 through 7, collar 20 may take different shapes. Preferably, the outside of collar 20 has a curved section 36 immediately adjacent to first inner perimeter 26. This may help redirect moisture away from protrusion 12 and assist in it draining away. FIGS. 5 and 6 show a collar 20 that tapers gradually and continually between first inner perimeter 26 and second inner perimeter 28. In FIG. 7, second inner perimeter 28 is a lip 38 that extends inward from a straight portion 40 that extends between first and second collar perimeters 26 and 28. In FIG. 4, collar 20 has a rectangular shape to engage a utility box, for example. As will be recognized by those in the art, collar 20 may take other shapes other than round or rectangular (where rectangular also includes squares). In addition, the design of collar 20 between first and second inner perimeter 26 and 28 on either the inside or outside of collar 20, may vary depending on the preferences of the user.

Figure 10:
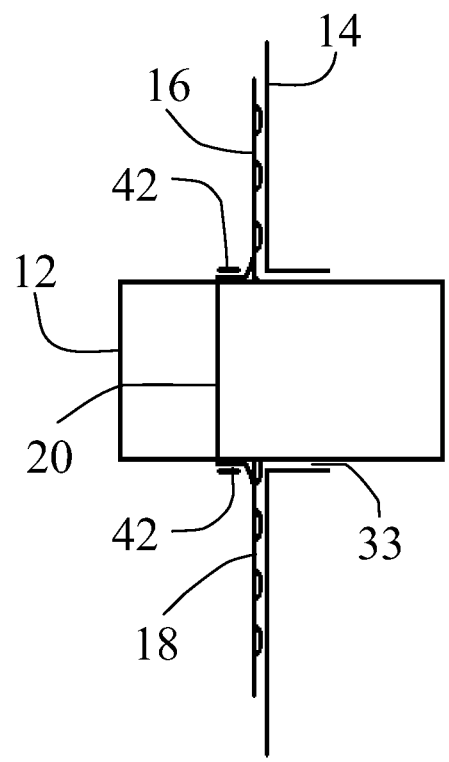
FIGS. 10 and 11 are side elevation views of variations of the seal.
Figure 11:
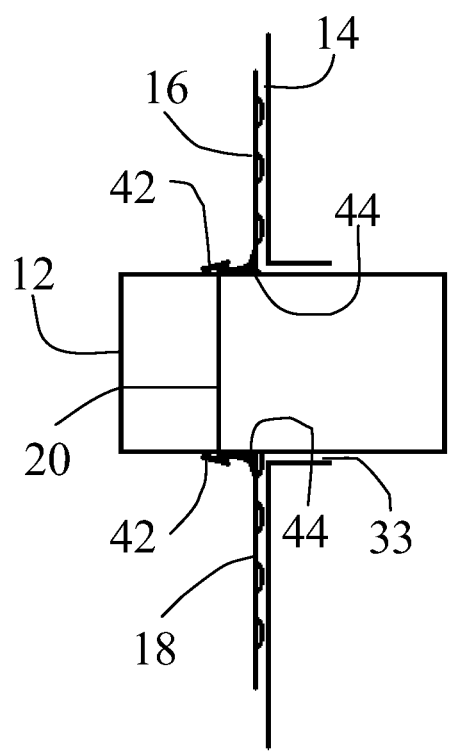

If sheet 16 is made from a resilient material, second inner perimeter 28 is preferably smaller than outer diameter 30. If sheet 16 is designed to provide a resilient seal, it will preferably be made from a resilient material that retains its elasticity, such as a cross-linked plastic or rubber. Other materials may stretch, or "creep" over time, reducing the seal. Alternatively, a seal may be made and maintained using another element, such as a pressure member 42 as shown in FIG. 10 or a sealant 44, as shown in FIG. 11. Referring to FIG. 10, pressure member 42 may be an elastic band or other band fastener placed around collar 20 and tightened to induce a seal. Referring to FIG. 11, the sealant may be a strip adhesive 44, or caulking 44, or other applied adhesive, etc. As shown, caulking 44 is applied on the inside of collar 20 as it is installed over protrusion 12. However, it may also be applied to the second inner perimeter 28 of collar 20, as with strip adhesive 44.

Figures 12, 13:
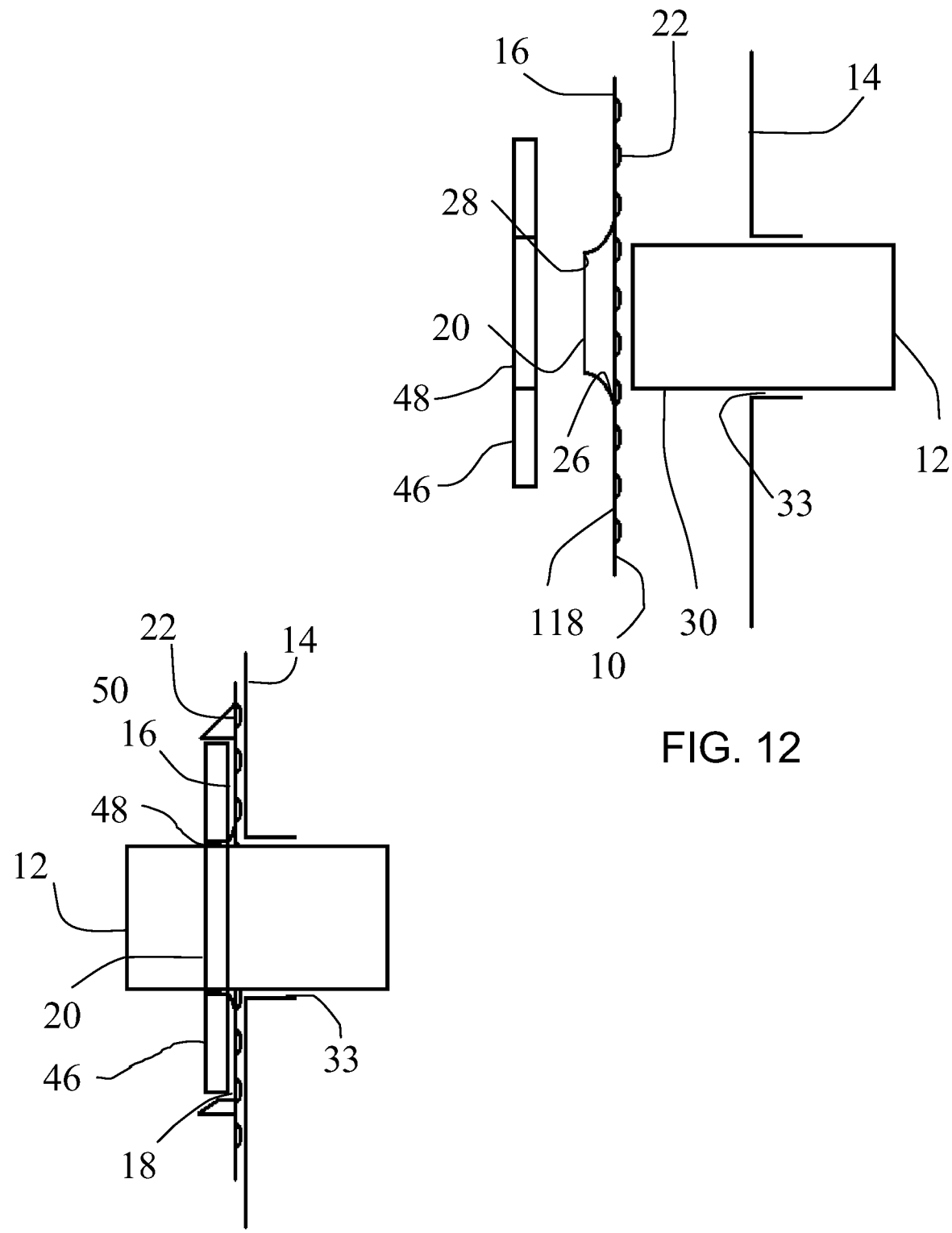
FIGS. 12 and 13 are side elevation views in section of the seal in combination with a face plate.

Referring now to FIGS. 12 and 13, there is shown a further embodiment where a face plate 46 having an opening 48 is installed over seal 10 and protrusion 12. When installing on the outer surface of a building, it is convenient to have square sides that make it easier to finish the siding, or to provide a more finished appearance to the protrusion. Face plate 46 is installed by being placed over seal 10, such that collar 20 is received within opening 48. Face plate 46 may be securely fastened to seal 10 prior to installation, or it may be positioned separately from seal 10. Face plate 46 may be screwed into place, or held by any other convenient method. Face plate 46 preferably has an outer perimeter that is smaller than the outer perimeter of wall cover portion 18, such that wall cover portion 18 may be used to overlap with the weatherproofing material installed on the rest of the building, as described above.

Referring to FIG. 13, seal 10 may be formed such that there is a lip or profile above and below, and possibly on the sides, of face plate 46 to help redirect water such that water does not enter behind face plate 46. This helps ensure the weatherproofing and integrity of seal 10 and face plate 46.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. An exterior wall of a building, comprising:
   a wall structure having an outer surface and a weather resistant barrier that protects the wall structure against weather, the weather resistant barrier comprising a sheet of weatherproofing material that covers substantially all of the outer surface of the wall structure;
   a protrusion extending out from the outer surface;
   a seal for sealing around the protrusion, the seal comprising:
      a sheet made from flexible material, the sheet comprising a wall cover portion and a protrusion engaging collar, wherein:
         the wall cover portion defines an inner perimeter and an outer perimeter, the wall cover portion having a first face and a second face that is opposite the first face, the first face facing towards the outer surface;
         wherein the protrusion engaging collar is continuously and integrally formed with the wall cover portion from the same material, and wherein the material of the protrusion engaging collar and the wall cover portion have the same material properties; and
         the protrusion engaging collar extends directly outward from the second face of the wall cover portion and, at rest, defines a hole having an axis perpendicular to the wall cover portion, the collar having a first inner perimeter adjacent to the wall cover portion and a second inner perimeter spaced from the wall cover portion, the first inner perimeter being larger than an outer perimeter of the protrusion and the second inner perimeter being equal to or smaller than the outer perimeter of the protrusion, such that, when installed on the protrusion, the collar sealingly engages the outer perimeter of the protrusion with the protrusion engaging collar extending away from the outer surface;

wherein:
the wall cover portion comprises an overlap section that overlaps the sheet of weatherproofing material;
the wall cover portion and the sheet of weatherproofing material are attached together adjacent to the overlap section;
the first face of the wall cover portion overlies the outer surface such that air flow is permitted between the wall cover portion and the outer surface from the inner perimeter to the outer perimeter of the wall cover portion; and
the sheet of weatherproofing material extends outwards from the overlap section to cover the outer surface of the building.

2. The exterior wall of claim 1, wherein the protrusion is piping that passes through a hole in the outer surface of the wall structure, the piping having an outer diameter that is less than an inner diameter of the hole defined by the protrusion engaging collar.

3. The exterior wall of claim 1, wherein the sheet made from flexible material is resilient, and the second inner perimeter is smaller than the outer perimeter of the protrusion, the second inner perimeter providing a resilient seal around the outer perimeter of the protrusion.

4. The exterior wall of claim 1, wherein a pressure member seals the collar around the outer perimeter of the protrusion.

5. The exterior wall of claim 1, wherein a sealant seals the collar to the outer perimeter of the protrusion.

6. The exterior wall of claim 1, wherein the second face of the wall cover portion comprises a textured face.

7. The exterior wall of claim 6, wherein the textured face comprises bumps.

8. The exterior wall of claim 6, wherein the textured face comprises ridges.

9. The exterior wall of claim 1, wherein the first inner perimeter has a round or rectangular shape.

10. The exterior wall of claim 1, wherein the protrusion engaging collar is reversible.

11. The exterior wall of claim 1, further comprising a face plate having an opening that is installed adjacent to the sheet made from flexible material such that the protrusion engaging collar is received within the opening of the face plate.

12. The exterior wall of claim 11, wherein the wall cover portion extends out past the face plate.

13. The exterior wall of claim 11, wherein, when the face plate is installed, the wall cover portion comprises a profile along an outer perimeter of the face plate.

14. A method of installing a seal on a protrusion extending out from an exterior wall of a building, the method comprising the steps of:
installing a sheet of weatherproofing material on an outer surface of the exterior wall of the building such that the sheet of weatherproofing material covers substantially all of the outer surface, the sheet of weatherproofing material comprising a weather resistant barrier that protects the exterior wall against weather;
providing a sheet made from flexible material, the sheet comprising a wall cover portion defining an inner perimeter and an outer perimeter, and a protrusion engaging collar, wherein:
the wall cover portion has a first face and a second face that is opposite the first face, the first face comprising a continuous flat contact face, the flat contact face being devoid of contours extending out from the flat contact face, between the inner perimeter of the wall cover portion and the outer perimeter of the wall cover portion;
the protrusion engaging collar is continuously and integrally formed with the wall cover portion from the same material, and the material of the protrusion engaging collar and the wall cover portion have the same material properties;
the protrusion engaging collar extends directly outward from the second face of the wall cover portion and, at rest, defines a hole having an axis perpendicular to the wall cover portion, the collar having a first inner perimeter adjacent to the wall cover portion and a second inner perimeter spaced from the wall cover portion, the first inner perimeter being larger than an outer perimeter of the protrusion and the second inner perimeter being equal to or smaller than the outer perimeter of the protrusion;
installing the sheet made from flexible material over the protrusion from the exterior wall such that the protrusion engaging collar seals around the outer perimeter of the protrusion and the wall cover portion is adjacent to and overlies the outer surface of the exterior wall with the first face of the wall cover portion facing towards the outer surface of the exterior wall and the protrusion engaging collar extending away from the exterior wall and such that an overlap section of the wall cover portion overlaps the sheet of weatherproofing material, the wall cover portion overlying the exterior wall such that airflow is permitted between the wall cover portion and the exterior wall of the building from the inner perimeter to the outer perimeter of the wall cover portion; and
attaching the wall cover portion and the weatherproofing material together adjacent to the overlap section, the sheet of weatherproofing material extending outwards from the overlap section to cover the exterior wall of the building.

15. The method of claim 14, wherein the flat contact face faces the outer surface of the exterior wall.

16. The method of claim 14, wherein the protrusion is piping that passes through a hole in the exterior wall of the building, the piping having an outer diameter that is less than an inner diameter of the hole defined by the protrusion engaging collar.

17. The method of claim 14, wherein the second face of the wall cover portion comprises a textured face.

18. The method of claim 14, further comprising the step of installing a face plate adjacent to the sheet made from flexible material, the protrusion engaging collar being received within an opening of the face plate.

* * * * *